Nov. 22, 1955  C. A. OSTLING  2,724,425
TIRE BUILDING METHOD
Filed June 30, 1953  4 Sheets-Sheet 3
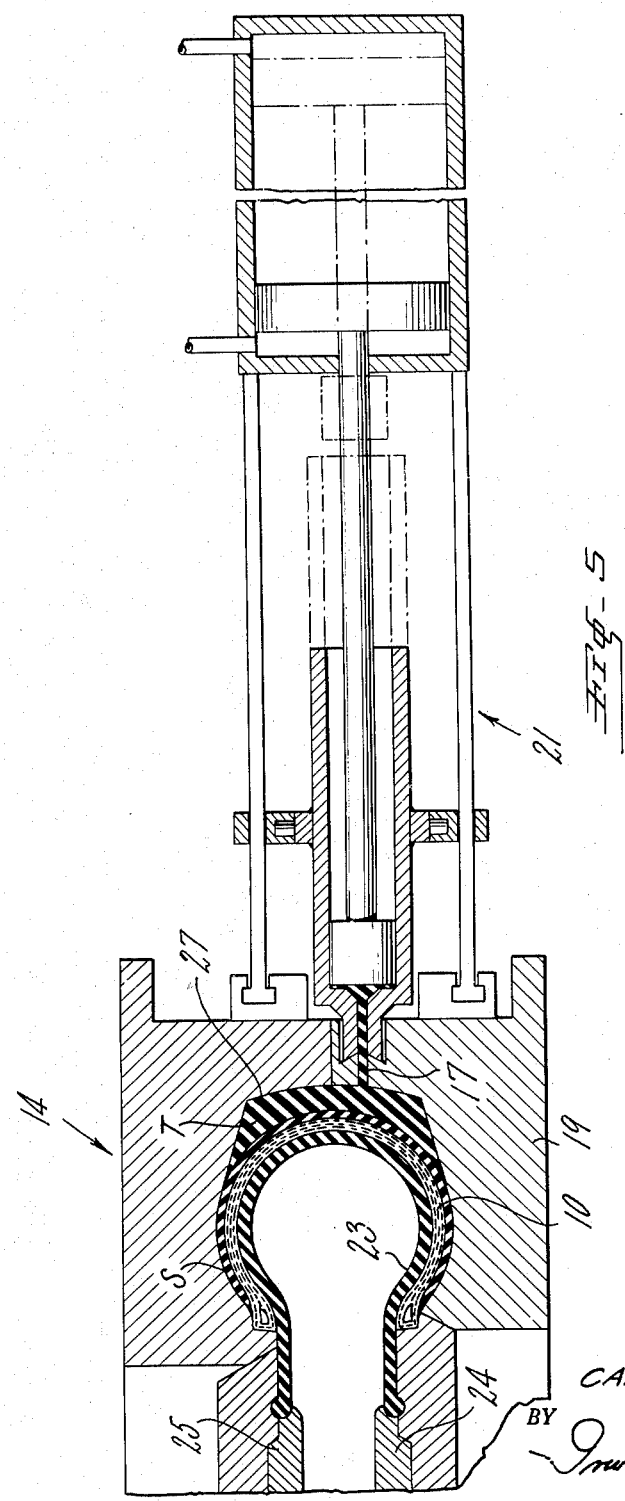
INVENTOR.
CARL A. OSTLING
BY
Irwin M. Lewis
ATTORNEY

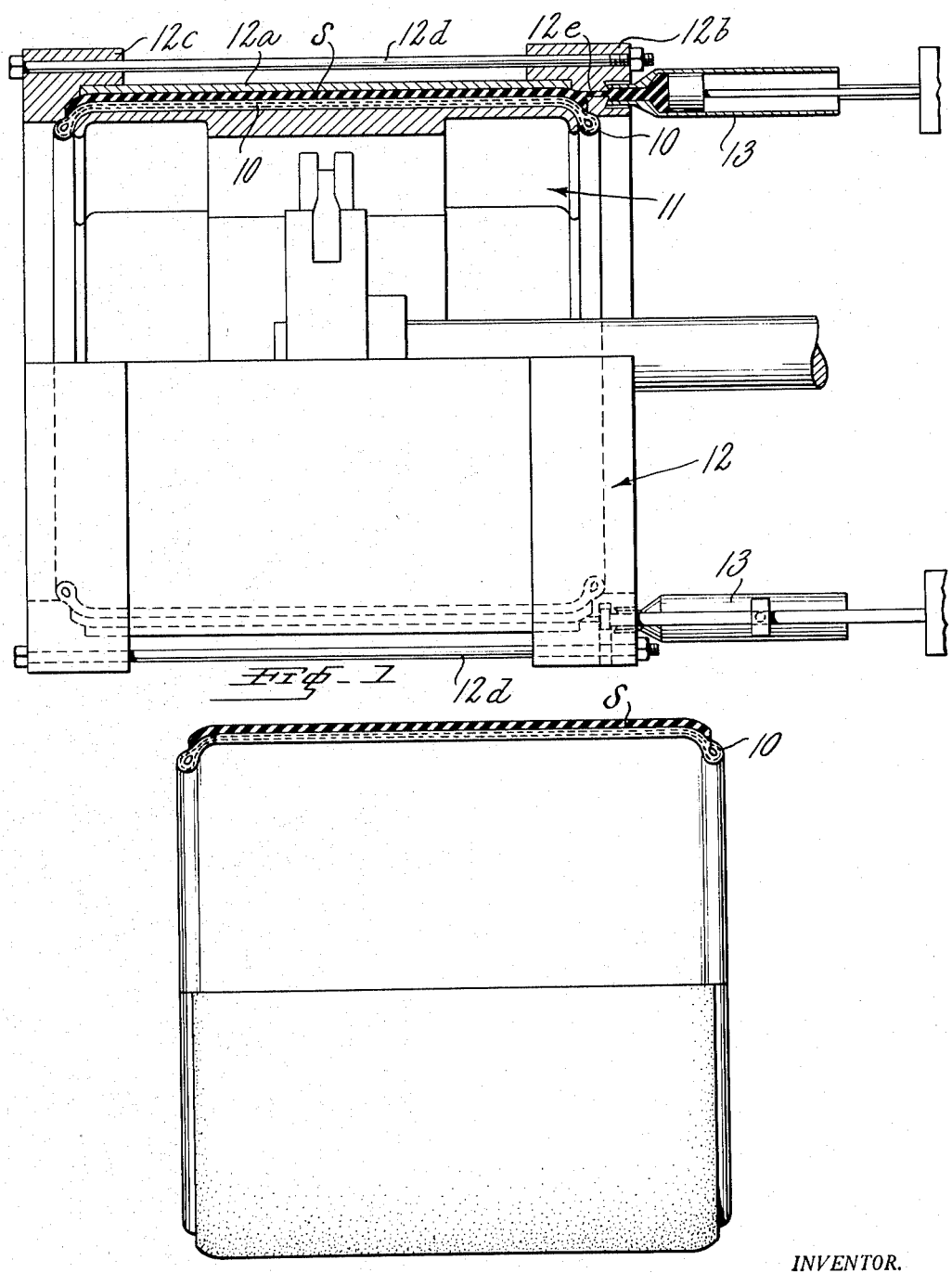

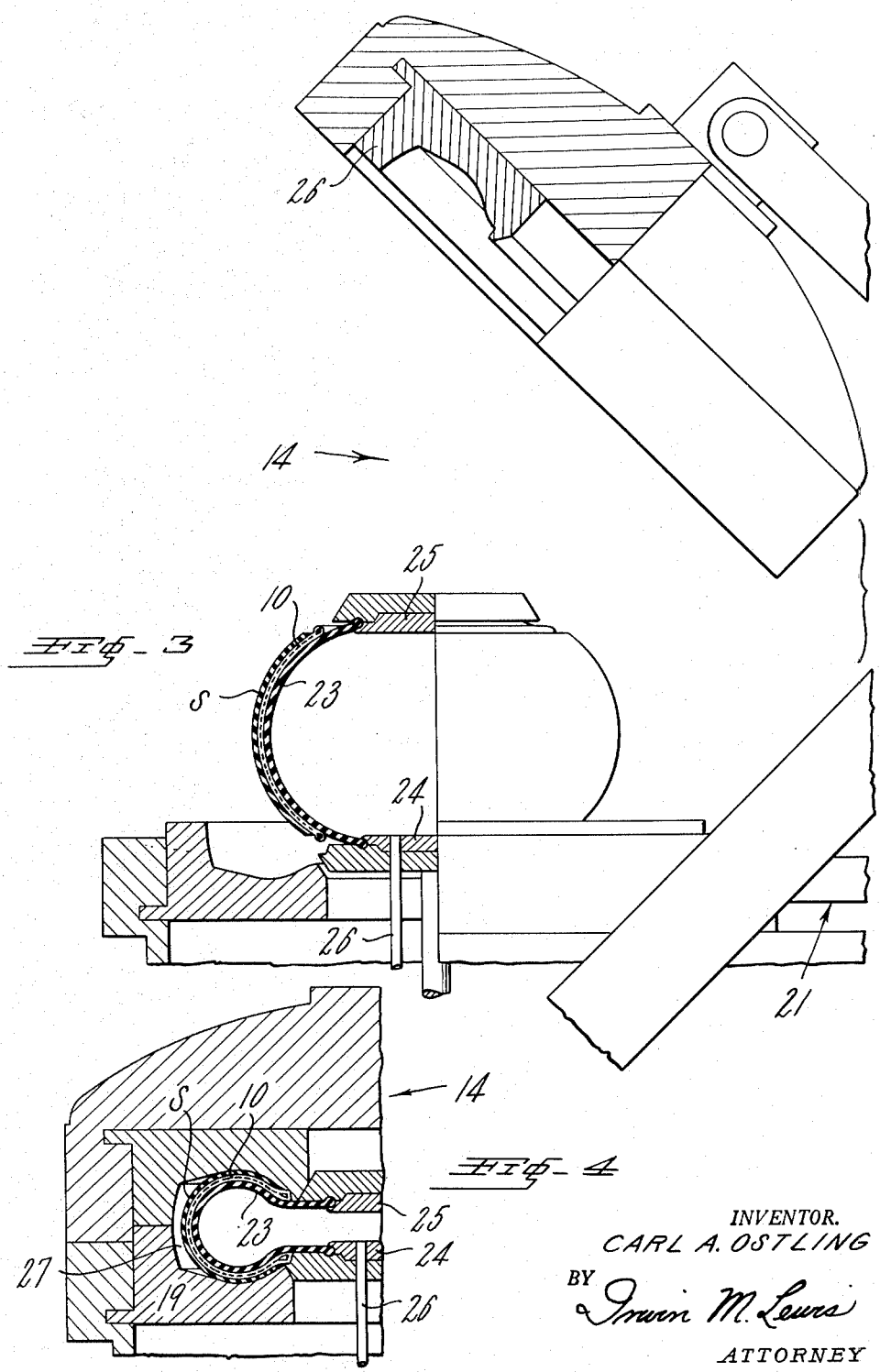

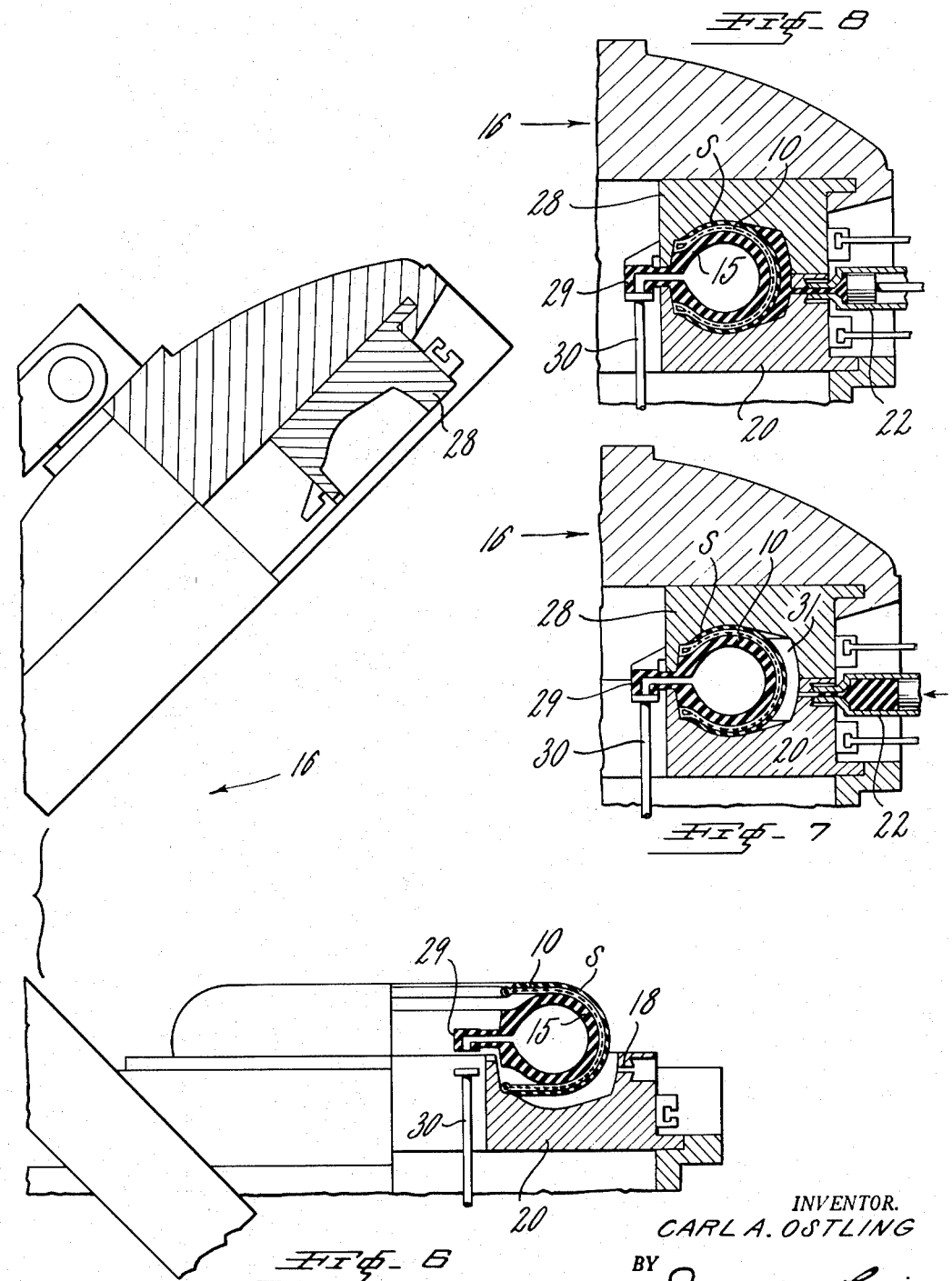

United States Patent Office 2,724,425
Patented Nov. 22, 1955

2,724,425

TIRE BUILDING METHOD

Carl A. Ostling, New York, N. Y., assignor to United States Rubber Company, New York, N. Y., a corporation of New Jersey Application June 30, 1953, Serial No. 365,196

7 Claims. (Cl. 154—14)

This invention relates to a method of making tires and more particularly to a method of making tires having a tread portion of one type of rubber compound and a sub-tread and sidewall portion of another type of rubber compound.

While rubber stocks may be compounded to give various desired properties, no single rubber compound exhibits both good wear resistance and good crack resistance though stocks can be compounded to give one or the other of these properties. It has, therefore, been the practice to utilize a rubber stock exhibiting good wear resistant properties for the tread of a tire and to utilize a different rubber stock exhibiting good crack resistant properties for the sub-tread and sidewall portions of a tire to thereby utilize the best stock for each of these portions. Such a tire construction is commonly known as a "cap and base" construction to indicate that the "cap" or tread is made of a different stock from that of the "base" or sub-tread portion of the tire.

The primary object of the present invention is to provide a method of making a tire of "cap and base" construction in which injection molding is utilized to form the tread portion of the tire and preferably both the tread portion and the sub-tread and sidewall portions of the tire.

While it has heretofore been proposed to form a tire from a single type of rubber composition by injecting rubber stock directly onto a tire carcass while it is in a tire mold to form the tread, sub-tread and sidewall portions, no satisfactory or efficient method has been devised for forming tires of a "cap and base" construction in which two different types of rubber stock must be used. Tires of a "cap and base" construction have been heretofore made by first fabricating on a tire building drum a band shaped carcass of rubberized fabric plies and inextensible bead rings and then first wrapping a strip of sub-tread and sidewall stock circumferentially around the carcass and then superimposing thereon a strip of tread or cap stock. Thereafter the carcass with the sub-tread and sidewall stock and the tread or cap stock thereon was removed from the drum and shaped to approximate tire shape around an expansible curing form and formed while subjected to high internal pressure in a heated tire mold.

Such a method of forming tires of a "cap and base" construction has many disadvantages which affect both the quality and the cost of the finished tires. The tread, sub-tread and sidewall stock must be extruded in continuous strips, cut to predetermined lengths, and stored as a bank ahead of the building operation. This requires heavy equipment and skilled operators. Large storage areas and extensive scheduling programs are necessary to take care of the various types of extruded stock necessary to produce different sizes and designs of tires. Further, the characteristics of the extruded stock necessarily changes during the storage period. Sufficient material must be placed onto the raw carcass in the building operation to fill the indentations in the mold which form the desired exterior design of the finished tire. To assure filling these indentations in the mold, it is necessary to heat the stock to a plastic state in the mold and then exert high pressure on the inside of the carcass to flow the stock into the indentations and to displace air trapped between the stock and the mold. This application of high pressure to the inside of the carcass causes the cords in the ply material to either stretch or pull at the bead area so that the fabric of the carcass is subject to uncontrolled movement during the curing period. This results in non-uniformity of the finished tires.

The present invention contemplates a two stage method of forming a "cap and base" construction. In the first stage, a carcass of rubberized fabric plies and inextensible bead rings are formed on a tire building drum in the conventional manner. A layer of sub-tread and sidewall stock is then injection molded directly on the carcass while it is still on the tire building drum or is applied as strips in the conventional manner. In the second stage, the carcass with the sub-tread and sidewall stock thereon is removed from the building drum, shaped to approximate tire shape over an annular inflatable curing form or diaphragm and confined in the cavity of a heated tire mold. Only sufficient pressure is admitted to the inflatable form to mold and form the beads and sidewalls. Not enough pressure is admitted to materially stretch the crown of the carcass, so that a space is left between the crown of the carcass and the interior wall of the tire mold cavity. Tread or cap stock is then injected into this space to form the tread, sufficient pressure being maintained in the curing form to prevent the carcass from distorting during the injecting of the tread stock. Thereafter the pressure within the curing form may be increased to compact the tread stock.

As the stock is injected it fills the indentations of the mold without the necessity of the application of as high internal pressure as is necessary in the methods heretofore used. Accordingly, stretching or pulling of the carcass, particularly at the bead areas and uncontrolled movement of the fabric during molding of the tire is materially minimized and tires so produced are much more uniform and have better balance. The problems of storage and scheduling of the extruded strips of stock inherent in the method heretofore used and the splicing problems inherent in such methods are eliminated.

Other objects and advantages of the present invention will become apparent from the following description when read in conjunction with the accompanying drawings wherein:

Fig. 1 is a sectional view of a tire building drum and surrounding mold showing sub-tread and sidewall stock being injected onto a band shaped fabric tire carcass while the carcass is supported on the tire building drum, Fig. 2 is a partial sectional view of the band shaped carcass with the sub-tread and sidewall stock applied thereto as removed from the tire building drum, Fig. 3 is a partial sectional view of a diaphragm type tire shaping and vulcanizing press showing the carcass of Fig. 2 in position over the diaphragm thereof preparatory to the shaping and vulcanizing of the carcass, Fig. 4 is a partial sectional view of the press of Fig. 3, showing the press closed and the carcass shaped so as to leave a space between the crown of the carcass and the mold wall into which tread stock can be injected, Fig. 5 is a partial sectional view of the press of Fig. 3 showing the injection of tread stock into the space between the crown of the carcass and the wall of the mold cavity to form the tread, Fig. 6 is a partial sectional view of a watchcase type tire shaping and vulcanizing press showing the carcass of Fig. 2 partially shaped around a conventional curing bag and positioned in the press preparatory to completely shaping and vulcanizing the carcass, Fig. 7 is a partial sectional view of the press of Fig. 6 showing the press closed and the carcass shaped so as to leave a space between the crown of the carcass and the mold wall into which tread stock can be injected, and Fig. 8 is a partial sectional view of the press of Fig. 6 showing the tread stock being injected into the space between the crown of the carcass and the mold cavity to form the tread.

Referring to Fig. 1 of the drawings, there is shown the injection molding of a layer of sub-tread and sidewall stock S onto a previously fabricated band shaped fabric carcass 10 while the carcass is supported on a conventional type, collapsible tire building drum 11.

The carcass 10 is of the usual construction and includes a plurality of superimposed plies of rubberized fabric, either natural or synthetic, and inextensible beads to which the lateral edges of the fabric are anchored. The carcass is fabricated by wrapping the various plies around the drum 11 and applying the beads to the lateral edges thereof in the conventional manner. Suitable breaker strips and chafing strips may be provided in the fabrication of the carcass if desired.

After fabrication of the carcass 10 and while it is still carried by the building drum 11, it is surrounded by a mold 12 as shown in Fig. 1, so as to provide an enclosed space of the proper dimensions around the exterior surface of the carcass into which the sub-tread and sidewall stock S of the desired composition may be injected by portable or stationary injection presses 13.

The mold 12 includes a central cylindrical portion 12a formed of two or more segments and two end clamping rings 12b and 12c. The rings 12b and 12c engage the beads of the carcass 10 and form a seal at this point. Tie bolts 12d extending between the rings 12b and 12c hold the rings 12b and 12c and the central cylindrical portion 12a in assembled relationship and permit easy disassembly thereof. The ring 12b is provided with openings 12e through which the stock is injected by injection presses 13 into the space between the central cylindrical portion 12a and the surface of the carcass 10. The central portion 12a is spaced from the surface of the carcass 10 a distance equal to the desired thickness of the sub-tread and sidewall layer. The injection presses 13 are shown secured to the ring 12b but they can be mounted on a separate support if desired without physical attachment to the ring 12b. The particular injection presses shown are of the type described in U. S. Patent No. 2,533,468 to Jurgeleit. Other types of injection devices can, however, be used if desired.

The sub-tread and sidewall stock S is specially compounded to give the desired properties of flexibility and crack-resistance which are particularly desirable for the sub-tread and sidewall portions of the tire. The compound S may be either natural or synthetic rubber or blends thereof.

After the sub-tread and sidewall stock S has been applied to the carcass 10 as above described, the mold 12 is removed from around the carcass 10, the drum 11 collapsed, and the carcass 10 with the stock S thereon is removed from the drum 11. The carcass 10 after removal from the drum 11 is shown in Fig. 2. It will be noted that no tread stock has been applied to the carcass at this point.

The carcass 10 with the sub-tread and sidewall stock S thereon is next placed either in a diaphragm type tire press 14 as shown in Fig. 3 or is partially shaped around an annular curing form 15, commonly known as a curing bag, and placed in a suitable mechanical or hydraulic press such as a watchcase type or unit type tire press 16 as shown in Fig. 6. Both of these tire presses shown are conventional equipment well known to those skilled in the art. For the purpose of the present invention, each of these presses 14 and 16 has been modified by providing an opening 17 (Fig. 5) or 18 (Fig. 6) respectively through the wall of the lower mold halves 19 and 20 thereof so that tread stock may be injected into the mold cavity in the region of the crown of the carcass. Each of the presses 14 and 16 are provided with an injection press 21 (Fig. 5) or 22 (Fig. 7) for injecting stock through the openings 17 or 18 into the cavity of the mold. The particular injection presses shown are of the type described in U. S. Patent No. 2,533,468 to Jurgeleit and reference is made thereto for a detailed description of its structure and function. The injection presses 14 and 16 may be secured to either of the mold halves, to other press structures or to a separate support.

A diaphragm press of the type shown in Fig. 3 is shown in U. S. Patent No. 2,495,663 to Soderquist and reference is made thereto for a detailed description of the structure and function thereof.

In using the press of Fig. 3, the carcass 10 as shown in Fig. 2 is placed over and around the conventional expandable diaphragm 23. The diaphragm 23 is attached to a lower plate 24 and an upper plate 25 and when the upper mold half 26 of the press 14 is closed, the plates are moved together so that the diaphragm 23 forms an annular curing form or core which is confined within the carcass 10 as shown in Fig. 4. Heated fluid under pressure is admitted to the diaphragm by means of a conduit 26 to shape and form the carcass 10 against the wall of the mold cavity. In accordance with the present invention, only sufficient pressure is admitted to the diaphragm 23 to shape and form the carcass and to prevent the carcass from distorting when tread stock is injected into the mold to form the tread as will hereinafter be described. Not enough pressure is admitted to materially stretch the carcass and a space 27 is left between the crown of the carcass and the corresponding portion of the wall of the mold cavity as shown in Fig. 4. Tread stock T is then injected into this space 27 by means of the injection press 21 as shown in Fig. 5. Thereafter the pressure in the diaphragm 23 may be increased to compact the injected tread stock T.

The tread stock T is specially compounded to provide good wear resistance and is therefore of a different composition than the sub-tread and sidewall stock S. The carcass 10 with the sub-tread and sidewall stock S and the tread stock T applied thereto is left in the heated press 14 until it has been heated for a sufficient time to provide the desired degree of vulcanization and is then removed from the press.

In using the watchcase type press of Fig. 6, the carcass 10, with the sub-tread and sidewall stock S applied thereto as shown in Fig. 2, is first shaped to approximate tire shape in a vacuum box (not shown) and the curing bag 15 inserted in the carcass as is conventional tire building practice. The carcass 10 with the curing bag 15 therein is then placed in the lower mold half 20 of the press 16 as shown in Fig. 6, and the upper mold half 28 closed as shown in Fig. 7. When the press is closed, the inflating stem 29 of the curing bag 15 is pressed into sealing engagement with the end of a conduit 30 which is connected to a source of heated fluid under pressure. Fluid under pressure is then admitted to the bag 15 through the conduit 30. Only sufficient pressure is admitted to shape and form the carcass. Not enough pressure is admitted to materially stretch the carcass and a space 31 is, therefore, left between the crown of the carcass 10 and the corresponding portion of the wall of the mold cavity as shown in Fig. 7. Tread stock T is then injected into this space 31 by the injection press 22 as shown in Fig. 8 to form the tread of the tire. Thereafter the pressure in the curing bag 15 may be increased to compact the injected tread stock T. The carcass with the sub-tread and sub-sidewall stock S and tread stock T applied thereto is left in the press 16 for a sufficient time to effect the desired degree of vulcanization.

From the above description, it can be seen that there is provided a novel method of building a tire of "cap and base" construction.

For the most part, conventional tire building equipment, slightly modified, may be used to form the tire in accordance with the invention. The sub-tread and sidewall stock is preferably applied to the carcass by injection molding while the carcass is still on a conventional tire building drum. The tread stock is applied to the carcass by injection molding while the carcass is contained in the mold of a conventional tire shaping and vulcanizing press.

The tread being injection-molded, the carcass need not be subjected to high internal pressure in order to flow the stock into the indentations of the mold as is necessary in forming tires according to the methods heretofore used. Accordingly, stretching and pulling of the fabric at the bead areas and uncontrolled movement of the fabric during the molding operation is materially minimized and the tires so formed are more uniform and have better balance.

It is to be understood that in utilizing either the tire press 14 of Fig. 3 or the press 16 of Fig. 6, that the carcass 10 with the sidewall and sub-tread stock thereon may be preliminarily heated and partially vulcanized while in the press prior to the injection of the tread stock T. Vulcanizing the sidewall and sub-tread stock prior to the injection of the tread stock serves to anchor and fix the fabric so as to prevent displacement thereof when the pressure in the diaphragm 23 or curing bag 15 is increased preparatory to and during the injection of the tread stock T and subsequent vulcanization of the tread stock.

While the invention has been described in conjunction with certain tire building equipment, it is to be understood that equipment other than that specifically shown and described may be used in performing the invention if desired without departing from the spirit and scope of the invention.

Having thus described my invention, what I claim and desire to protect by Letters Patent is:

1. A method of forming a tire casing comprising, forming in band form on a tire building drum a carcass of rubberized fabric and inextensible bead rings, applying a layer of rubber stock of sufficient thickness to form the sub-tread and sidewall portions of the tire to the outer surface of the carcass while it is on the tire building drum, removing the carcass with said rubber stock thereon from the tire building drum, shaping the carcass to approximate tire shape over a curing form, confining the shaped carcass with the curing form therein in the cavity of a heated tire mold, injecting a different type of rubber stock into the cavity of said tire mold adjacent the crown of the carcass to form the tread and continuing the heating of the carcass and rubber stock until it is vulcanized.

2. A method of forming a tire casing comprising, forming in band form on a tire building drum a carcass of rubberized fabric and inextensible bead rings, applying a layer of rubber stock of sufficient thickness to form the sub-tread and sidewall portions of the tire to the outer surface of the carcass while it is on the tire building drum, removing the carcass with said rubber stock thereon from the tire building drum, shaping the carcass to approximate tire shape over an inflatable curing form, confining the shaped carcass with the curing form therein in the cavity of a heated tire mold, maintaining sufficient pressure in the inflatable curing form to shape and form the bead and sidewall portion of the carcass without substantially stretching the carcass so as to leave a space between the crown of the carcass and the wall of the cavity of the tire mold, injecting a different type rubber stock in said space to form the tread and continuing the heating of the carcass until the rubber stock is vulcanized.

3. A method of forming a tire casing comprising, forming in band form on a tire building drum a carcass of rubberized fabric and inextensible bead rings, applying a layer of rubber stock of sufficient thickness to form the sub-tread and sidewall portions of the tire to the outer surface of the carcass while it is on the tire building drum, removing the carcass with said rubber stock thereon from the tire building drum, shaping the carcass to approximate tire shape over an annular, inflatable, curing form, confining the shaped carcass with the curing form therein in the cavity of a heated tire mold, maintaining sufficient pressure in the inflatable curing form to shape and form the bead and sidewall portions of the carcass without stretching the carcass so as to leave a space between the crown of the carcass and the walls of the cavity of the tire mold, injecting a different type rubber stock in said space to form the tread, increasing the pressure within the curing form after the rubber stock is injected in said space to compact said stock and continuing the heating of the carcass until it is vulcanized.

4. A method of forming a tire casing comprising, forming in band form on a tire building drum a carcass of rubberized fabric and inextensible bead rings, confining the carcass while still on the tire building drum within the cavity of a mold, providing a space of sufficient depth and size between the wall of the mold and the external surface of the carcass to accommodate sufficient rubber stock to form the sub-tread and sidewall portions of the finished tire, injecting rubber stock into said space and onto said carcass, removing said carcass with the rubber stock therein from said mold and from said tire building drum, shaping the carcass to approximate tire shape over a curing form, confining the shaped carcass with the curing form therein in the cavity of a heated tire mold, injecting a different type rubber stock into the cavity of the mold adjacent the crown of the carcass and continuing the heating of the carcass until the rubber stock is vulcanized.

5. A method of forming a tire casing comprising, forming in band form on a tire building drum a carcass of rubberized fabric and inextensible bead rings, confining the carcass while still on the tire building drum in the cavity of a mold providing a space of sufficient depth and size between the wall thereof and the external surface of the carcass to accommodate sufficient rubber stock to form the sub-tread and sidewall portions of the finished tire, injecting a rubber stock into said space and onto said carcass, removing said carcass with the rubber stock thereon from said mold and from said tire building drum, shaping the carcass to approximate tire shape over an annular, inflatable, curing form, confining the shaped carcass with the curing form therein in the cavity of a heated tire mold, maintaining sufficient pressure in the inflatable curing form to shape and form the bead and sidewall portions of the carcass without stretching the carcass so as to leave a space between the crown of the carcass and the wall of the cavity of the tire mold, injecting a different type rubber stock into said space to form the tread and continuing the heating of the carcass and rubber stock until it is vulcanized.

6. A method of forming a tire casing comprising, forming in band form on a tire building drum a carcass of rubberized fabric and inextensible bead rings, confining the carcass while still on the tire building drum in a mold cavity providing a space of sufficient depth and size between the walls thereof and the external surface of the carcass to accommodate sufficient rubber stock to form the sub-tread and sidewall portions of the finished tire, injecting rubber stock into said space, removing said carcass with the rubber stock thereon from said mold and from said tire building drum, shaping the carcass to approximate tire shape over an annular, inflatable, curing form, confining the shaped carcass with the curing form therein in the cavity of a heated tire mold, maintaining sufficient pressure in the inflatable curing form to shape and form the bead and sidewall portions of the carcass without stretching the carcass so as to leave a space between the crown of the carcass and the walls of the cavity of a tire mold, injecting a different type rubber stock into the said space to form the tread, increasing the pressure within the curing form after said rubber stock is injected in said space to compact said stock and continuing the heating of the carcass until it is vulcanized.

7. The method of forming a tire casing comprising, applying a carcass of rubberized fabric, inextensible beads, and a layer of rubber forming sidewall and subtread portions over an annular curing form, confining the carcass with the curing form therein in the cavity of a heated tire mold, maintaining sufficient pressure in the inflatable curing form to shape and press the sidewall and bead portions of the carcass against the wall of the cavity of the mold, injecting rubber stock into a space between the crown of the carcass and the wall of the tire mold and continuing the heating of the carcass and rubber stock until it is vulcanized.

References Cited in the file of this patent
UNITED STATES PATENTS

| | | |
|---|---|---|
| 2,476,884 | Maynard | July 19, 1949 |
| 2,497,226 | McNeill | Feb. 14, 1950 |
| 2,625,199 | Glynn | Jan. 13, 1953 |
| 2,649,134 | Steinle | Aug. 18, 1953 |
| 2,649,891 | Hinman | Aug. 25, 1953 |
| 2,672,914 | Weigold et al. | Mar. 23, 1954 |
| 2,686,554 | Hinman | Aug. 17, 1954 |